United States Patent [19]

Grenda

[11] 4,289,597
[45] Sep. 15, 1981

[54] PROCESS FOR ELECTRODIALYTICALLY REGENERATING AN ELECTROLESS PLATING BATH BY REMOVING AT LEAST A PORTION OF THE REACTED PRODUCTS

[75] Inventor: David W. Grenda, Houston, Pa.

[73] Assignee: Electrochem International, Inc., Pittsburgh, Pa.

[21] Appl. No.: 122,242

[22] Filed: Feb. 19, 1980

Related U.S. Application Data

[63] Continuation-in-part of Ser. No. 17,086, Mar. 5, 1979, abandoned.

[51] Int. Cl.$^3$ .............................................. B01D 57/02
[52] U.S. Cl. ............................ 204/180 R; 204/180 P
[58] Field of Search ......................... 204/180 R, 180 P

[56] References Cited

U.S. PATENT DOCUMENTS

| | | | |
|---|---|---|---|
| 3,394,068 | 7/1968 | Calmon et al. | 204/180 P |
| 3,764,503 | 10/1973 | Lancy et al. | 204/180 P |
| 4,105,532 | 8/1978 | Haines et al. | 204/301 |
| 4,111,772 | 9/1978 | Horn | 204/180 P |

OTHER PUBLICATIONS

Korngold, Electrodialysis in Advanced Water Treatment, Desalination, vol. 24, pp. 129-139, Elsevier (1978).

Primary Examiner—F. Edmundson
Attorney, Agent, or Firm—Stanley J. Price, Jr.; John M. Adams

[57] ABSTRACT

A process is provided for regenerating a spent electroless copper plating bath which contains alkali metal salts resulting from the reduction of a water soluble copper salt under copper plating and reducing conditions. The regeneration is effected by means of the electrodialytic transfer of at least a portion of the anions in the spent plating bath through an anionic permselective membrane into the anode compartment of an electrodialytic cell. In the preferred embodiment, hydroxyl ions from the cathode compartment of the electrodialytic cell are concurrently transferred through a second anionic permselective membrane to replace the transferred anions, the replacement taking place in a compartment of the electrodialytic cell located between the two anionic permselective membranes.

7 Claims, 1 Drawing Figure

U.S. Patent  Sep. 15, 1981  4,289,597
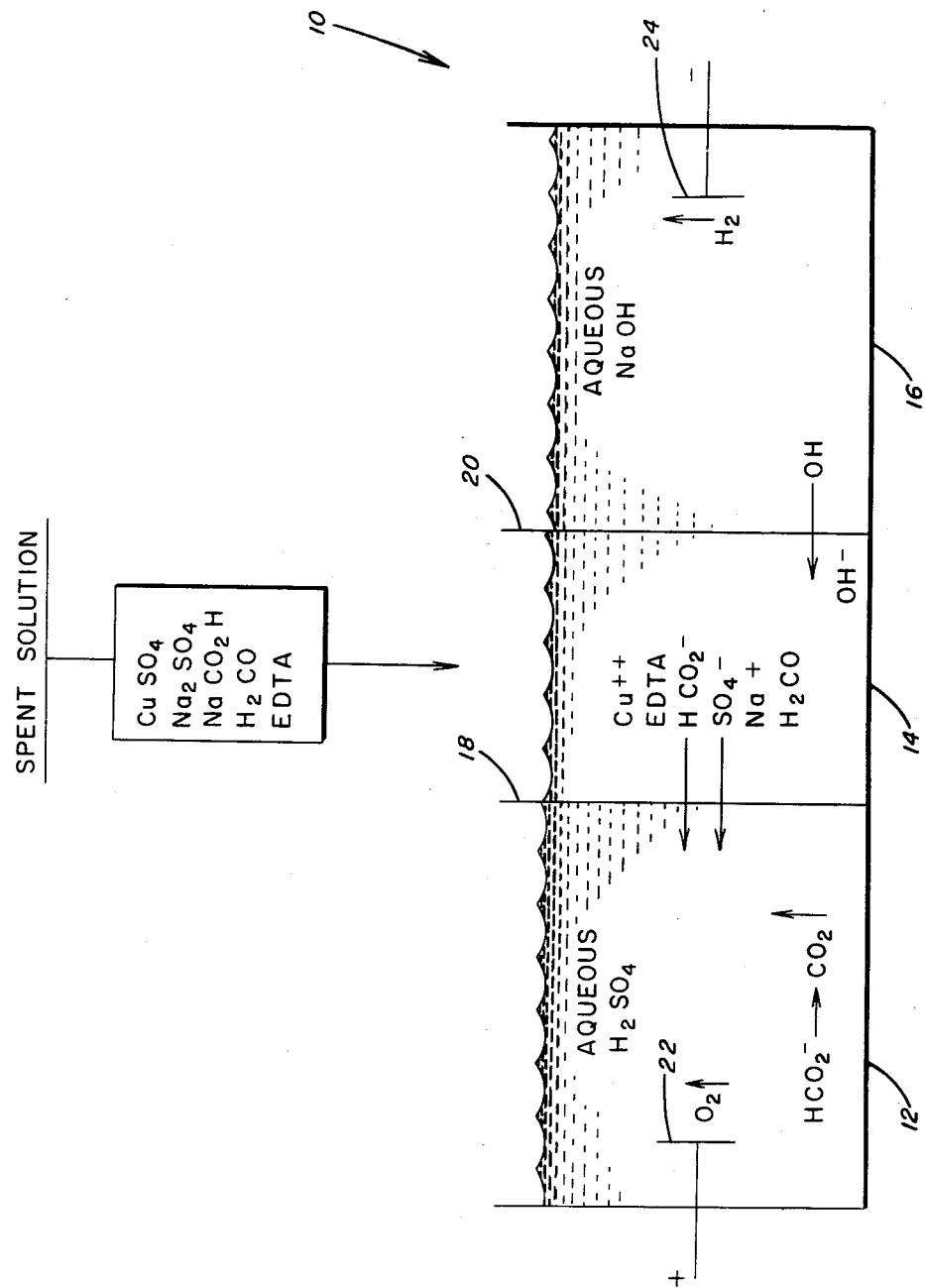

PROCESS FOR ELECTRODIALYTICALLY REGENERATING AN ELECTROLESS PLATING BATH BY REMOVING AT LEAST A PORTION OF THE REACTED PRODUCTS

CROSS-REFERENCE TO RELATED APPLICATION

This application is a continuation-in-part of my copending application Ser. No. 017,086 filed Mar. 5, 1979, now abandoned, and assigned to the assignee of the present application.

BACKGROUND OF THE INVENTION

1. Field of the Invention

This invention relates to a process for electrodialytically removing at least a portion of the reaction products from an electroless plating bath and more particularly to a process for removing at least a portion of the reaction products and increasing the pH of an electroless copper plating bath.

2. Description of the Prior Art

Electroless metal plating baths that are used commercially generally contain a water soluble salt of the metal to be deposited on the selected substrate and a reducing agent in an aqueous alkaline solution. A complexing or chelating agent is commonly present to prevent precipitation of metal hydroxide. The reducing agent generally is more effective at high pH values, and large amounts of alkali metal hydroxide are consumed in the reduction of the metal salt. When formaldehyde is used as the reducing agent substantially larger amounts of alkali metal hydroxide are consumed because of disproportionation of formaldehyde with hydroxide into formate. The reaction products of the reduction reaction are alkali metal salts, such as sodium formate and sodium sulfate. A build up of these reaction products causes cuprous oxide to form spontaneously within the plating bath leading to general bath decomposition. Also during the plating process substantial amounts of alkali metal hydroxide are consumed since four moles of alkali metal hydroxide are required for each mole of copper deposited. Thus the pH of the plating bath rapidly drops, causing loss of effective plating, i.e., metal deposition, unless the alkali metal hydroxide is replenished. It would be desirable to selectively remove at least a portion of the reaction product anions and also increase the pH of the plating bath whereby only a solution of the metal salt and reducing agent, together with a small amount of the chelating or complexing agent, if needed, is added to the regenerated plating bath to provide a plating bath again suitable for electroless plating.

SUMMARY OF THE INVENTION

In accordance with my invention, in its broadest aspects, a process is provided for removing at least a portion of the anionic reaction products from a spent electroless copper plating bath by withdrawing the undesired anions through an anionic permselective membrane. In the preferred embodiment the spent plating bath from an electroless copper plating bath is regenerated in a regeneration zone or center compartment of an electrodialytic cell positioned between an anolyte compartment and a catholyte compartment. Two anionic permselective membranes separate the respective compartments and permit the selective passage or migration of anions therethrough, to the substantial exclusion of cations. The catholyte compartment contains a source of hydroxyl anions in aqueous solution generally an alkali metal hydroxide, while the anolyte compartment contains an aqueous solution, either alkaline or acidic. The solution in the anolyte compartment is selected to receive the anionic reaction products or by-products of the reduction reaction that occurs during the electroless plating. The electrodialytic cell is arranged during operation to effect the migration of hydroxyl ions from the catholyte zone through the anionic membrane to the regeneration zone or center compartment, and also to effect concurrently the migration of the anions of the reaction product salts from the regeneration zone through the anionic membrane into the anolyte zone, thereby effecting replacement of the anions of the alkali metal salts by hydroxyl ions, with resulting increase in pH of the solution in the regeneration zone.

As previously stated a complexing or chelating agent is present to prevent precipitation of metal hydroxide. Sodium ethylenediaminetetraacetate (hereinafter in the specification referred to as EDTA) has so far been found to be most effective to permit the electrodialytic removal of at least a portion of the reaction products from the spent electroless copper plating bath without significant loss of the EDTA.

The process of my invention thus provides for the regeneration of a spent electroless copper plating bath. Such baths are commonly used for plating on non-conductors; for example, for metalizing printed circuit boards and for plating plastics as the starting coat for subsequent electroplating.

BRIEF DESCRIPTION OF THE DRAWING

The drawing is a diagrammatic view of an electrodialytic cell showing the spent solution in the center compartment and the transfer of salt anions to the anode compartment while hydroxyl ions are being transferred from the cathode compartment to the center compartment.

DESCRIPTION OF THE PREFERRED EMBODIMENT

Referring to the drawing, there is diagrammatically illustrated an electrodialytic cell 10 which is divided into three compartments 12, 14 and 16 by two vertical parallel walls 18 and 20. These latter walls are composed at least in part of anion permselective membranes. The spent solution from an electroless copper plating tank (not shown) is introduced into the center or regeneration compartment 14. The term spent solution as used in this description of the preferred embodiment is intended to designate an electroless plating bath in which copper sulfate has reacted with formaldehyde to reduce the copper sulfate to copper, and form an alkali metal sulfate and an alkali metal formate as reaction products.

The anode compartment 12 has an anode 22 positioned therein and contains an aqueous anolyte solution for receiving anions migrating through the permselective membrane 18. The cathode compartment 16 has a cathode 24 positioned therein and contains an aqueous catholyte solution which is adapted to supply hydroxyl ions, preferably from sodium hydroxide for migration through the permselective membrane 20. The two outer anode and cathode compartments 12 and 16 and the center compartment 14 form the electrodialytic cell with the center or regeneration compartment 14 interposed between the anode and cathode compartments 12 and 16 with anion permselective membranes 18 and 20 in common with the anode compartment 12 and the cathode compartment 16 resepectively.

The spent electroless copper plating solution is suitably conducted to the regeneration compartment 14. The copper salt present in the spent solution as the source of copper ions is cupric sulfate, $CuSO_4$. The complexing or chelating agent which is added to prevent precipitation of copper hydroxide is EDTA. Formaldehyde is preferred as the selected reducing agent in the plating operation. Since its reducing power increases with the alkalinity of the solution, the baths are usually operated at a pH above 11. The required alkalinity is preferably provided by sodium hydroxide.

For each mole of copper electrolessly plated, at least two moles of formaldehyde and four moles of hydroxide are consumed and one mole of hydrogen gas is evolved, in accordance with the following equation:

$$CuSO_4 + 2H_2CO + 4NaOH \rightarrow Cu° + H_2 + 2H_2O + 2HCO_2Na + Na_2SO_4 \quad (1)$$

It is these reaction products, sodium formate and sodium sulfate, which if allowed to build up, cause cuprous oxide to form spontaneously within the plating bath, leading to general bath decomposition, as demonstrated by the following reactions:

$$2Cu^{+2} + HCHO + 2OH^- \rightarrow Cu_2O + HCO_2^- + 3H_2O \quad (2)$$

$$Cu_2O \rightarrow Cu° + CuO$$

In addition to reaction products reduction, sodium hydroxide must be maintained in the plating bath as indicated by equation 1. At least four moles of sodium hydroxide are required for each mole of copper deposited for the proper operation of the electroless copper plating bath. The pH of the plating bath is thus critical in the operation of the bath. Formaldehyde has maximum reducing power existing at a pH of 12.8. As the bath is used, the pH is lowered, thus reducing the speed of plating.

In accordance with this invention, hydroxyl ions are caused to electrodialytically migrate from the cathode compartment 16 through the anion permselective membrane wall 20 in a sufficient amount to increase the pH of the solution in the regeneration compartment 14. $H_2$ is evolved at the cathode 24. At the same time the formate and sulfate ions correspondingly electrodialytically migrate from the regeneration compartment 14 through the anion permselective membrane 18 into the anode compartment 12. The formate ions are converted to carbon dioxide and water; and oxygen is evolved at the anode. The sulfate ions may be converted to sulfuric acid and collected when sulfuric acid is present in the anolyte compartment 12. When sodium hydroxide is present in the anolyte compartment 12 the sulfate ion reacts with the sodium hydroxide to form sodium sulfate.

Thus, through the use of this invention, the products of reaction, sodium formate and sodium sulfate, are reduced to a concentration which is not detrimental to the plating solution. All that is required to prepare a suitable plating solution is to add copper sulfate, formaldehyde and when needed a small amount of EDTA.

EXPERIMENTAL SECTION

Preferred Embodiment

A 3-compartment electrodialytic cell having a configuration corresponding to that shown diagrammatically in the drawing was used to demonstrate the effectiveness of the invention. The electrodialytic cell had the following specifications:

Anode: platinum on titanium 2"×3.2"
Cathode: stainless steel 2"×3.2"
Anion Membranes: Neosepta ACLE-5P made by Tokuyama Soda Co., Tokuyama, Japan
Current Density: 25 ASF

RESULTS

Where sodium hydroxide is present in the anode compartment, the following occurred:

| Time | Anode Compartment 3000 mls | Cathode Compartment 3000 mls | Regeneration Compartment 2000 mls | Rectifier |
|---|---|---|---|---|
| 0 | NaOH 46.6 g/l<br>Cu<br>$Na_2CO_3$ 1.6 g/l<br>$SO_4^=$ | NaOH 43.3 g/l<br>$Cu^{++}$ | pH 11.6<br>$Cu^{+2}$ 2.8 gm/l<br>$H_2CO$ 1.4 gm/l<br>EDTA 27.8 g/l<br>$SO_4^=$ 31.2 g/l | 6.2 VDC<br>2.5 AMPS |
| 60 min | NaOH 43.4 g/l<br>$Cu^{++}$ 13 PPM<br>$Na_2CO_3$ 3.2 g/l<br>$SO_4^=$ .615 gm/l | NaOH 43.4 g/l<br>$Cu^{++}$ 4 PPM | pH 12.4<br>$Cu^{++}$ 2.85 gm/l<br>$H_2CO$ 1.4 gm/l<br>EDTA 27.7 gm/l<br>$SO_4^=$ 30.20 gm/l | 6.2 VDC<br>2.5 AMPS |
| 90 min | NaOH 41.7 g/l<br>$Cu^{++}$ 30 PPM<br>$Na_2CO_3$ 6.3 g/l<br>$SO_4^=$ 1.20 g/l | NaOH 43.4 g/l<br>$Cu^{++}$ 6.5 PPM | pH 12.6<br>$Cu^{++}$ 2.80 gm/l<br>$H_2CO$ 1.4 gm/l<br>EDTA 27.6 gm/l<br>$SO_4^=$ 29.5 gm/l | 6.2 VDC<br>2.5 AMPS |

As shown by the data 2000 mls of the spent solution were circulated through the regeneration compartment for a period of 90 minutes. The concentration of EDTA in the regeneration compartment remained substantially the same while the pH of the solution increased from 11.6 to 12.6. The $Cu^{++}$ and formaldehyde concentration remained substantially the same after treatment for 90 minutes while the sodium carbonate in the anode compartment increased from 1.6 grams per liter to 6.2 grams per liter. The sulfate increased from 0 to 1.20 grams per liter in the anode compartment. Where sulfuric acid was present in the anode compartment, the following occurred:

| Time | Anode Compartment 2000 mls | Cathode Compartment 3000 mls | Regeneration Compartment 2000 mls | Rectifier |
|---|---|---|---|---|
| 0 | $H_2SO_4$ 22.0 g/l<br>$Cu^{++}$ 4.7 PPM | NaOH 43.4 g/l<br>$Cu^{++}$ 6.7 PPM | pH 11.6<br>$Cu^{+2}$ 2.8 g/l<br>$H_2CO$ 1.4 gm/l<br>EDTA 27.9 gm/l | 7.0 VDC<br>2.5 AMPS |
| 75 min | $H_2SO_4$ 27.9 g/l<br>$Cu^{++}$ 12.5 PPM<br>$H_2CO_3$ | NaOH 43.4 g/l<br>$Cu^{++}$ 5.2 PPM | pH 12.6<br>$Cu^{++}$ 2.8 g/l<br>$H_2CO$ 1.4 g/l<br>EDTA 27.7 gm/l | 7.0 VDC<br>2.5 AMPS |

As shown by the data 2000 mls of the spent solution were circulated through the regeneration compartment for a period of 75 minutes. The concentration of EDTA in the regeneration compartment remained substantially the same while the pH of the solution increased from 11.6 to 12.6. The $Cu^{++}$ and formaldehyde concentration remained substantially the same after the 75 minute period with a negligible amount of $Cu^{++}$, i.e., 7.8 PPM migrating into the anode compartment while the $H_2SO_4$ in the anode compartment increased from 22.0 grams per liter to 27.9 grams per liter evidencing removal of sulfate ions from the regeneration compartment, $CO_2$ evolved in the anode compartment evidencing the removal of the formate.

EXPERIMENTAL SECTION

GENERAL

The experiments reported below were conducted to establish the applicability of the present invention for the regeneration of spent electroless copper plating baths wherein (1) various complexing or chelating agents (other than EDTA) to prevent precipitation of copper hydroxide were used and (2) different but commonly used soluble copper salts (other than $CuSO_4$) were used as the source of cupric ions in an electroless copper plating bath.

(1) Complexing or Chelating Agents:

Although E.D.T.A. is specifically cited herein as the preferred complexing agent for the cupric ions in the bath, several other compounds are employed in this capacity in the electroless copper plating industry. It was the intention of this study to test baths using other complexing agents and ascertain whether these compounds would also remain contained in the regeneration compartment and show no movement into the anolyte compartment during the electrodialysis process of this invention. Groups of complexing agents were evaluated by testing one representative compound most commonly used by electroless copper platers. Bath compositions were selected from various patents citing the particular complexing agent tested and care was taken to simulate a spent bath by addition of a large excess of sodium sulfate as a reaction product. The cell specifications and conditions described in the preferred embodiment were closely followed.

The complexing agents tested were:

(1) Sodium Potassium Tartrate (Rochelle Salts)

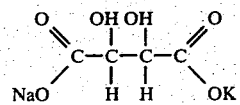

(2) Thioglycollic Acid (thio derivatives of alkyl glycols)

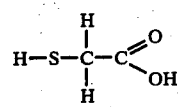

(3) Triethanolamine (polyaminoalcohols)

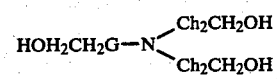

(4) Nitrilotriacetic Acid-NTA (polycarboxylic acids)

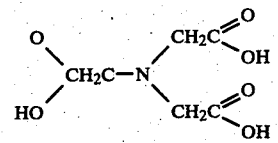

(5) Hydroxyethylenediaminetriacetic acid-HEDTA (modified ethylenediaminetetraacetic acids)

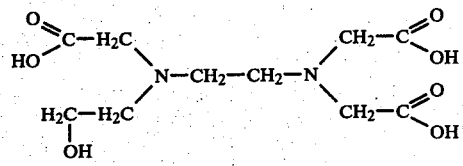

(6) Glycono Lactone (widely used due to commercial availability)

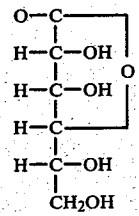

Each complexing agent was tested as a component of a 3000 ml. bath used as the rgeneration compartment of the cell. The anolyte compartment was 3000 mls. of 30 g/l $H_2SO_4$ and the catholyte compartment was 3000 mls. of 50 g/l NaOH. Two hour runs of each complexing agent were conducted at 50 ASF (5 amps, 8.5–9.5 VDC). As reaction products, 30 g/l $Na_2SO_4$ was present.

RESULTS

|  | Complexing Agent Transferred Out of Regeneration Compartment | Cu Transferred Out of Regeneration Compartment | Efficiency of SO4 Transfer Out of Regeneration Compartment |
| --- | --- | --- | --- |
| NaK Tartrate | None | .5 ppm/hr | 40% |
| Thioglycollic Acid | None | 1.0 ppm/hr | 44% |
| Triethanolamine | None | .6 ppm/hr | 48% |
| NTA | None | 3 ppm/hr | 53% |
| HEDTA | 650 ppm/hr | 50 ppm/hr | 65% |
| Glucono Lactone | None | .75 ppm/hr | 54% |

DISCUSSION

The above results compare favorably with the data of the original work using E.D.T.A. as the complexing agent. The study affords strong evidence that the basic principle of the present invention is essentially unaffected by the choice of complexing agent selected from those commonly used. No transfer of complexing agent in all but one case and only trace losses of copper out of the regeneration compartment, coupled with the continued successful removal of sulfate reaction products is positive confirmation of the applicability of the invention as defined.

The HEDTA testing was the only area in which results departed from the ideal case. In this case, small amounts of copper and HEDTA were observed migrating into the anolyte compartment. However, efficient removal of the sulfate reaction product was not interferred with and the overall operation of the cell was normal.

CONCLUSION

None of the complexing agents selected from the various classes of complexing agents interfered with the efficient removal of reaction products from a spent electroless copper plating bath in accordance with the present invention.

(2) Soluble Copper Salts

Cupric sulfate is generally recognized as the preferred copper salt for electroless copper plating. However, other water soluble copper salts, such as the chloride, nitrate and acetate may also be used as the source of cupric ions. An electroless copper plating bath using copper chloride as the source of cupric ions was tested in the cell described in the preferred embodiment. The cell specifications and conditions were as described therein, using copper chloride as the source of cupric ions, EDTA and 30 g/l sodium sulfate as reaction product. This test was also run for two hours.

Results at the end of two hours:
Complexing Agent Transferred Out of Regeneration Compartment—None
Cu Transferred Out of Regeneration Compartment—2.6 ppm
Efficiency of So4 Transferred Out of Regeneration Compartment—48%
Conclusion:

The excellent results obtained in the copper chloride testing coupled with the previous success of the copper sulfate, points strongly to the use of any water soluble cupric salt as the source of cupric ions in an electroless copper plating bath for the purpose of this invention.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. In a process for electrodialytically regenerating a spent electroless copper plating bath resulting from the reduction of a water soluble cupric salt in an alkaline solution under copper plating and reducing conditions, said spent solution containing alkali metal salts as reaction products,
    (a) conducting said spent solution to a regeneration compartment of an electrodialytic cell,
    (b) establishing and maintaining an aqueous electrolyte as the anolyte of said electrodialytic cell in an anode compartment which has in common one wall with said regeneration compartment that is composed of a permselective anionic membrane, and
    (c) electrodialytically transferring anions of said alkali metal salts in the spent solution through said anionic membrane from the regeneration compartment to the anode compartment.

2. In a process for electrodialytically regenerating a spent electroless copper plating bath resulting from the reaction of a water soluble cupric salt with formaldehyde and an alkali metal hydroxide in the presence of an agent to prevent precipitation of copper hydroxide under copper plating and reducing conditions, said spent solution containing alkali metal salts as reaction products,
    (a) conducting said spent solution to a regeneration compartment of an electrodialytic cell,
    (b) establishing and maintaining an aqueous alkali metal hydroxide solution as the catholyte of said electrodialytic cell in a cathode compartment which has in common one wall of said regeneration compartment that is composed of a first anionic membrane,
    (c) establishing and maintaining an aqueous electrolyte as the anolyte of said electrodialytic cell in an anode compartment which has in common one wall with said regeneration compartment that is composed of a second permselective anionic membrane.
    (d) electrodialytically transferring anions of said alkali metal salts in the spent solution through said second anionic membrane from the regeneration compartment to the anode compartment, and
    (e) concurrently electrolytically transferring hydroxyl ions from said cathode compartment to said regeneration compartment to thereby replace the anions transferred to the anode compartment while retaining the alkali metal ions in the regeneration compartment.

3. In a process for electrodialytically regenerating an electroless copper plating bath wherein a cupric salt is reacted in an aqueous solution containing the sodium salt of ethylenediaminetetraacetate with an alkali metal hydroxide and formaldehyde under copper plating and reducing conditions in an electroless plating bath to yield a spent solution containing alkali metal formate and alkali metal sulfate as reaction products, (a) conducting said spent solution to a regeneration compartment of an electrodialytic cell,
(b) establishing and maintaining an aqueous electrolyte as the catholyte of said electrodialytic cell in a cathode compartment which has in common one wall of said regeneration compartment that is composed of a first anionic membrane,
(c) establishing and maintaining an aqueous electrolyte as the anolyte of said electrodialytic cell in an anode compartment which has in common one wall with said regeneration compartment that is composed of a second anionic membrane, and
(d) electrodialytically transferring sulfate and formate ions through said second of the two anionic membranes from the regeneration compartment to the anode compartment while retaining the alkali metal ions in the regeneration compartment.

4. A process according to claim 3 wherein said electrolyte in said cathode compartment is an aqueous solution of an alkali metal hydroxide, and
concurrently electrodialytically transferring hydroxyl ions from said cathode compartment to said regeneration compartment.

5. A process according to claim 3 wherein the catholyte is an aqueous solution of sodium hydroxide and the anolyte is an aqueous solution of sulfuric acid.

6. A process according to claim 3 wherein the anolyte is an aqueous acidic solution.

7. A process according to claim 3 wherein said catholyte is an aqueous solution of sodium hydroxide and said anolyte is an aqueous solution of sodium hydroxide.

* * * * *